United States Patent [19]
Theisen

[11] 3,927,243
[45] Dec. 16, 1975

[54] ALUMINIUM ENAMELS
[75] Inventor: Gunter Theisen, Riedlingen, Wurttemberg, Germany
[73] Assignee: Oberschwabische Metallwarenfabrik GmbH & Co. K.G., Riedlingen, Wurttemberg, Germany
[22] Filed: Apr. 11, 1973
[21] Appl. No.: 349,947

Related U.S. Application Data
[63] Continuation of Ser. No. 92,682, Nov. 25, 1970, abandoned.

[30] Foreign Application Priority Data
Nov. 27, 1969 Germany............................ 1959613

[52] U.S. Cl. .................... 428/433; 106/52; 220/64; 427/237; 427/376; 428/426; 428/450; 428/469
[51] Int. Cl.² ........................................... C22D 5/00

[58] Field of Search ........... 117/129, 23, 70, 53, 40; 106/1, 48, 52; 220/64

[56] References Cited
UNITED STATES PATENTS

| | | | |
|---|---|---|---|
| 2,846,325 | 8/1958 | Bennett | 106/48 |
| 2,995,468 | 8/1961 | Steiger | 106/48 |
| 3,383,225 | 5/1974 | Stradley | 117/129 |

*Primary Examiner*—Mayer Weinblatt
*Assistant Examiner*—Edith R. Buffalow

[57] ABSTRACT

In an enamel for aluminium containing $SiO_2$, $TiO_2$ and alkali metal oxide, bismuth oxide is used for dissolving the $TiO_2$ instead of conventional materials such as CdO, ZnO, BaO, SrO and PbO.

8 Claims, 4 Drawing Figures

ALUMINIUM ENAMELS

This is a continuation of co-pending application Ser. No. 92,682, filed Nov. 25, 1970 now abandoned.

The invention relates to aluminium enamels for the production or coating of surfaces coming into contact with foodstuffs or the like, more particularly the inner surfaces of kitchen ware consisting of aluminium or its alloys. Furthermore the invention relates to the use of this enamel for the production of such kitchen ware or the like, to a method for producing such kitchen ware and to the kitchen ware itself and other articles made of aluminium, aluminium alloys, coated with the enamel and having surfaces which come into contact with food or the like.

Known aluminium enamels generally contain silicon dioxide, titanium dioxide and alkali metal oxides together with one or more of the additional oxides. Such aluminium enamels can practically only be used for enameling the outer surfaces of kitchen ware, more especially saucepans, frying pans or the like because they contain more or less poisonous components which must not be allowed to come into contact with foods. More particularly conventional titanium dioxide dissolving oxides from the group cadmium oxide, zinc oxide, barium oxide, strontium oxide and lead oxide are harmful. Although non-poisonous enamels have been developed which are suitable for use for enameling the inner surfaces of aluminium kitchen ware, such enamels have the disadvantage that they are not sufficiently acid resistant and sufficiently resistant to cooking. Such an internal enamel would be attacked within a comparatively short time, for example after cooking potatoes for one hour, so that there would be a strong discoloration and loss in lustre, so that the enamel surface takes on an unpleasing appearance. On contact with acid containing foodstuffs such as sauerkraut, rhubarb and fruits such an enamel is strongly attacked by the acids in the material being cooked.

One aim of the invention is to provide an aluminium enamel which is free of poisonous components and is not attacked by acids in food, water in which potatoes are being cooked or other usual liquid components heated in kitchen ware so that it can be used without any disadvantages as an interior enamel for kitchen ware and equipment or other articles whose surfaces come into contact with food.

The present invention consists in a kitchen ware aluminium enamel comprising silicon dioxide ($SiO_2$), titanium dioxide ($TiO_2$), alkali metal oxides ($R_2O$) and at least one further addition, together with bismuth oxide ($Bi_2O_3$), the latter replacing previously conventional $TiO_2$ dissolving oxides from the group cadmium oxide (CdO), zinc oxide (ZnO), barium oxide (BaO), strontium oxide (SrO) and lead oxide (PbO).

The term aluminium is to be taken to include aluminium alloys. The addition can be in the form of a further oxide.

An aluminium enamel in accordance with the invention preferably has the following basic composition in percentages by weight:

| | |
|---|---|
| $SiO_2$ | 25 to 50 |
| $TiO_2$ | 10 to 35 |
| $R_2O$ | 20 to 40 |
| $Bi_2O_3$ | 2 to 15 |

Furthermore an aluminium enamel in accordance with the invention wich does not cause any harmful effects can comprise the following components in percentages by weight:

| | |
|---|---|
| $B_2O_3$ | 0 to 10 |
| $Al_2O_3$ | 0 to 7 |
| $SnO_2$ | 0 to 15 |
| CoO | 0 to 5 |
| NiO | 0 to 5 |
| MnO | 0 to 5 |
| CuO | 0 to 5 |
| FeO | 0 to 5 |

The further aim of the invention, that is to say the provision of kitchen ware or similar articles of aluminium or its alloys free of poisonous components which cannot be attacked by acids from food or the like is achieved in accordance with the invention in that at least the surfaces coming into contact with the food, more especially the inner surfaces, are coated with an aluminium enamel containing $SiO_2$, $TiO_2$, $R_2O$ (R denoting alkali metal oxide) and one or more additional oxides, in which the previously used $TiO_2$ dissolving oxide from the group CdO, ZnO, BaO, SrO and PbO is replaced by $Bi_2O_3$.

Preferably such kitchen ware can have its inner surfaces coated with an aluminium enamel with the following basic composition, in percentages by weight:

| | |
|---|---|
| $SiO_2$ | 25 to 50 |
| $TiO_2$ | 10 to 35 |
| $R_2O$ | 20 to 40 |
| $Bi_2O_3$ | 2 to 15 |

The respective aluminium enamel in accordance with the invention for use for coating kitchen ware can in addition contain other components such as $B_2O_3$, $Al_2O_3$, $SnO_2$, CoO, NiO, MnO, CuO and FeO, while keeping to the above percentages by weight given.

Such aluminium enamels and kitchen or like ware of aluminium coated with the enamels meet all requirements as regards freedom from toxic effects and as regards a good service life.

The accompanying drawing shows some embodiments of kitchen ware and parts of it in accordance with the invention.

Figure 1:
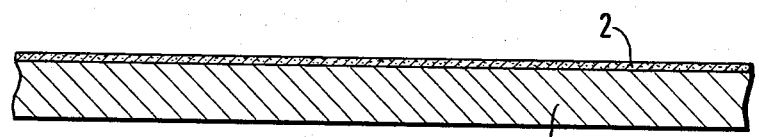
FIG. 1 shows a section through aluminium sheet with an enamel coating in accordance with the invention on its inner surface.
Figure 2:
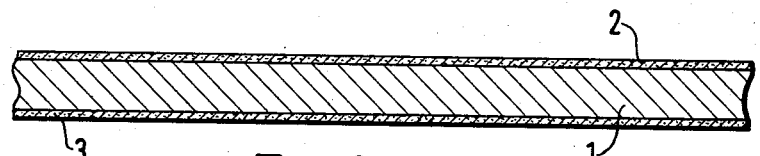
FIG. 2 shows a section of aluminium sheet material in accordance with FIG. 1 in which the outer surface is enameled in addition.

In FIGS. 1 and 2 the piece of aluminium sheet, which forms part of kitchen ware for example, is denoted by reference numeral 1. The inner surface coming into contact with food materials or other surfaces of the aluminium sheet j is coated with an aluminium enamel coating 2 of the above indicated composition. Generally the other, that is to say the outer surface, of the aluminium structure can be left without any coating, that is to say it has a metallic lustre. The outer surfaces can, however, be coated with an aluminium enamel (FIG. 2) of any suitable composition. For this purpose it is possible to use an aluminium enamel in accordance with the invention or another aluminium enamel 3, which does not need to contain bismuth oxide, so that it is cheaper to produce.

Figure 3:
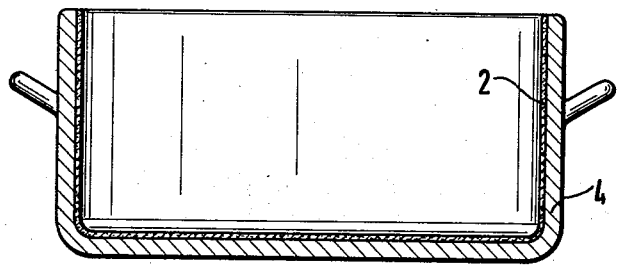
FIG. 3 shows an aluminium saucepan, whose inner surface is provided with an aluminium coating in accordance with the invention.

FIG. 3 shows a pot-like aluminium vessel 4 whose inner surface has a coating 2 of an aluminium enamel in accordance with the invention.

Figure 4:
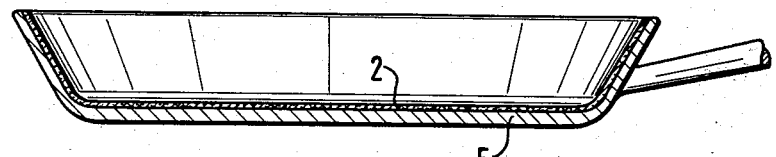
FIG. 4 shows an aluminium fryingpan whose inner surface is coated with an aluminium enamel in accordance with the invention.

As a further example FIG. 4 shows a fryingpan 5 or the like whose inner surface is also coated with enamel 2 in accordance with the invention.

The following tables indicate the composition of a few particularly advantageous forms of the invention (Examples 1 to 5) and the composition of a conventional aluminium enamel (6) without a bismuth oxide content for a comparison. The values are given in percentages by weight:

|  | 1 | 2 | 3 | 4 | 5 | 6 |
|---|---|---|---|---|---|---|
| $SiO_2$ | 28.9 | 28.9 | 23.9 | 33.6 | 26.5 | 25.34 |
| $TiO_2$ | 22.7 | 21.7 | 26.5 | 18.4 | 30.2 | 21.15 |
| $K_2O$ | 16.3 | 16.3 | 16.5 | 12.0 | 12.5 | 13.28 |
| $Na_2O$ | 12.5 | 13.5 | 10.3 | — | 7.3 | 18.62 |
| $B_2O_3$ | 6.6 | 4.0 | 7.2 | 5.5 | 5.2 | 4.92 |
| $Li_2O$ | — | 2.3 | 1.1 | 4.5 | 3.0 | 6.51 |
| $SnO_2$ | 5.6 | 5.6 | 6.7 | 7.3 | — | 7.94 |
| $Bi_2O_3$ | 2.1 | 5.6 | 7.8 | 10.0 | 13.3 | — |
| CoO | 2.2 | 2.2 | — | 2.7 | — | — |
| NiO | 2.1 | — | — | — | — | — |
| FeO | — | — | — | — | 2.0 | — |
| $Al_2O_3$ | — | — | — | — | — | 2.24 |
|  | 100 | 100 | 100 | 100 | 100 | 100 |

Particularly satisfactory results have been attained with enamel compositions 2, 3 and 4 in accordance with the invention given in the above table. The composition No. 2 is to be particularly recommended because while having excellent properties as an enamel, the content of comparatively expensive bismuth oxide is kept within economic limits.

In what follows the results of tests are given to provide a comparison between the enamel No. 2 in accordance with the invention and the known aluminium enamel No. 6.

Acid test with 10 % cold citric acid, 15 minutes

Enamel 2: AA (no apparent attack)

Enamel 6: B (loss of lustre and clearly visible attack)

Cooking test with distilled water, boiling for 16 hours

Enamel 2: no detectable loss, no loss in lustre

Enamel 6: loss at the rate of 70g/square meter, complete loss in lustre.

Potato test by cooking of salted potatoes, potatoes changed every hour

Enamel 2: 100 hours cooking time without discoloration or attack of enamel

Enamel 6: strong discoloration after 1 hour cooking time; after 5 hours the surface of the enamel became rough Alkali test with N/1 NaOH (caustic soda) 2½ hours, boiling Enamel 2: no measureable loss Enamel 6: loss of 50g/square meter From these test results it can be seen that the aluminium enamels in accordance with the invention and aluminium ware coated with them are clearly superior to known aluminium enamels and aluminium ware.

What I claim is:

1. A method for producing improved enameled aluninium food handling articles comprising:

preparing an aluminium enamel coating composition consisting essentially of $SiO_2$, $TiO_2$, at least one $R_2O$ compound, wherein R is an alkali metal and a quantity of $Bi_2O_3$ sufficient to dissolve the $TiO_2$; and coating a food contacting surface of an aluminium food handling article with said composition.

2. The method of claim 1 wherein said coating composition also includes at least one oxide selected from the group consisting of $B_2O_3$, $Al_2O_3$, $SnO_2$, CoO, NiO, MnO, CuO and FeO.

3. The method of claim 1 wherein said coating composition contains from 25 to 50 weight percent $SiO_2$, from 10 to 35 weight percent $TiO_2$, from 20 to 40 weight percent $R_2O$ and from 2 to 15 weight percent $Bi_2O_3$.

4. The method of claim 3 wherein said coating composition also includes at least one oxide selected from the group consisting of from 0 to 10 weight percent $B_2O_3$, from 0 to 7 weight percent $Al_2O_3$, from 0 to 15 weight percent $SnO_2$, from 0 to 5 weight percent CoO, from 0 to 5 weight percent NiO, from 0 to 5 weight percent MnO, from 0 to 5 weight percent CuO and from 0 to 5 weight percent FeO.

5. An enameled aluminium kitchenware article consisting essentially of:

an aluminium substrate presenting a food handling article having a food contacting surface; and an enamel coating on said surface, said coating consisting essentially of $SiO_2$, $TiO_2$, at least one $R_2O$ compound, wherein R is an alkali metal, and a quantity of $Bi_2O_3$ sufficient to dissolve the $TiO_2$.

6. An article as set forth in claim 5 wherein said coating also includes at least one oxide selected from the group consisting of $B_2O_3$, $Al_2O_3$, $SnO_2$, CoO, NiO, MnO, CuO, and FeO.

7. An article as set forth in claim 5 wherein said coating contains from 25 to 50 weight percent $SiO_2$, from 10 to 35 weight percent $TiO_2$, from 20 to 40 weight percent $R_2O$ and from 2 to 15 weight percent $Bi_2O_3$.

8. An article as set forth in claim 7 wherein said coating also includes at least one oxide selected from the group consisting of from 0 to 10 weight percent $B_2O_3$, from 0 to 7 weight percent $Al_2O_3$, from 0 to 15 weight percent $SnO_2$, from 0 to 5 weight percent CoO, from 0 to 5 weight percent NiO, from 0 to 5 weight percent MnO, from 0 to 5 weight percent CuO and from 0 to 5 weight percent FeO.

\* \* \* \* \*